United States Patent
Rose et al.

(10) Patent No.: US 12,014,190 B2
(45) Date of Patent: Jun. 18, 2024

(54) TYPE-CONSTRAINED OPERATIONS FOR PLUG-IN TYPES

(71) Applicant: Oracle International Corporation, Redwood Shores, CA (US)

(72) Inventors: John Robert Rose, San Jose, CA (US); Brian Goetz, Williston, VT (US)

(73) Assignee: Oracle International Corporation, Redwood Shores, CA (US)

( * ) Notice: Subject to any disclaimer, the term of this patent is extended or adjusted under 35 U.S.C. 154(b) by 183 days.

(21) Appl. No.: 17/091,849

(22) Filed: Nov. 6, 2020

(65) Prior Publication Data

US 2021/0055941 A1 Feb. 25, 2021

Related U.S. Application Data

(63) Continuation of application No. 16/515,111, filed on Jul. 18, 2019, now Pat. No. 10,860,338.

(Continued)

(51) Int. Cl.
*G06F 9/44* (2018.01)
*G06F 8/41* (2018.01)
(Continued)

(52) U.S. Cl.
CPC .......... *G06F 9/44526* (2013.01); *G06F 8/437* (2013.01); *G06F 9/4416* (2013.01); *G06F 9/547* (2013.01)

(58) Field of Classification Search
CPC .... G06F 8/437; G06F 9/4416; G06F 9/44526; G06F 9/547; G06F 8/436; G06F 9/44521
(Continued)

(56) References Cited

U.S. PATENT DOCUMENTS 6,018,628 A * 1/2000 Stoutamire ............. G06F 8/437
717/118
7,434,212 B2 * 10/2008 Wang .................. G06F 9/45516
717/148

(Continued)

OTHER PUBLICATIONS

Andreae et al., "A Framework for Implementing Pluggable Type Systems", 2006, ACM, pp. 57-74. (Year: 2006).*

(Continued)

*Primary Examiner* — Ted T. Vo
(74) *Attorney, Agent, or Firm* — Invoke

(57) ABSTRACT

Techniques for performing type-constrained operations for plug-in types are disclosed. A runtime environment encounters a request to perform a type-constrained operation that requires evaluating a type constraint associated with a particular plug-in type. The runtime environment lacks sufficient native instructions to evaluate type constraints associated with plug-in types. The runtime environment accesses a plug-in type framework to obtain a particular type descriptor instance associated with the particular plug-in type. The plug-in type framework is designated, prior to encountering any request to perform the type-constrained operation, for obtaining type descriptor instances which define constraints on plug-in types, to an extent that any such constraints exist. The particular type descriptor instance defines a particular type constraint that does not match any single built-in type. The runtime environment performs the type-constrained operation, which comprises using the particular type descriptor instance to evaluate the particular type constraint associated with the particular plug-in type.

20 Claims, 10 Drawing Sheets

Related U.S. Application Data

(60) Provisional application No. 62/801,552, filed on Feb. 5, 2019, provisional application No. 62/699,810, filed on Jul. 18, 2018.

(51) Int. Cl.
  *G06F 9/4401* (2018.01)
  *G06F 9/445* (2018.01)
  *G06F 9/54* (2006.01)

(58) Field of Classification Search
  USPC .......................... 717/114–118, 124, 140–143
  See application file for complete search history.

(56) References Cited

U.S. PATENT DOCUMENTS

| | | | |
|---|---|---|---|
| 8,813,027 B2 | 8/2014 | Ng et al. | |
| 8,955,043 B2 | 2/2015 | Swamy et al. | |
| 9,075,667 B2 | 7/2015 | Torgersen et al. | |
| 9,141,410 B2 | 9/2015 | Leafe et al. | |
| 9,652,207 B2 | 5/2017 | Hoban et al. | |
| 10,860,338 B2 * | 12/2020 | Rose | G06F 9/547 |
| 2007/0088707 A1 | 4/2007 | Durgin et al. | |
| 2010/0211930 A1 | 8/2010 | Zhang | |
| 2011/0258593 A1 | 10/2011 | Ng et al. | |
| 2012/0233668 A1 | 9/2012 | Leafe et al. | |
| 2014/0282441 A1 | 9/2014 | Hoban et al. | |
| 2017/0302589 A1 | 10/2017 | Leafe et al. | |

OTHER PUBLICATIONS

Bloom et al., "Thorn—Robust, Concurrent, Extensible Scripting on the JVM", 2009, ACM, pp. 117-136. (Year: 2009).*

Fong et al., "Pluggable Verification Modules: An Extensible Protection Mechanism for the JVM", 2004, ACM, pp. 404-418 (Year:2004).

Nystrom et al., "Constrained Types for Object-Oriented Languages", 2008, ACM, pp. 457-474 (Year: 2008).

* cited by examiner

| Type Descriptor String | Corresponding Type Species |
|---|---|
| Ljava/util/Map;/[ID] | Map<int,double> |
| Ljava/util/List;/[I] | List<int> |
| Ljava/util/List;/[[I] | List<int[]> |
| Ljava/util/List;/[$wild;] | wildcard species of List |
| Ljava/util/List;/$Wild; | wildcard alternate spelling |
| Ljava/util/List;/$Wild[Ljava/lang/Object;] | wildcard alternate spelling |
| [D/$length[5;] | fixed-sized array double[5], not an array of length-5 double |
| I/$interval[$ge;0;] | int whose value is non-negative |
| L/Ljava/util/TupleTemplate[Ljava/lang/String;I] | a pair of String and int |
| L/Ljava/util/TupleTemplate[FFF] | a triple of floats |
| Ljava/lang/String;/$N; | the N variant of String |
| (Ljava/lang/String;)Ljava/lang/String;/$N; | method wrapping an N-String |
| (Ljava/lang/String;/$N;)Ljava/lang/String; | method unwrapping an N-String |
| L/; | shortest possible expression, a trivially constrained Object |
| LFoo;/; | carrier type only, with trivial modification |
| L/$N; | type operator only, N-Object |
| L/[$Arg;] | lone argument with no type operator; no hypothetical meaning |
| L/LFoo[LBar;/$N;] | Foo<N-Bar> |
| L/LFoo[LBar;]/$N; | N-Foo<Bar> |
| [D/$length[5;]/$N; | N variant of fixed-sized array double[5] |
| [D/$N/$length[5;]; | fixed-sized variant of N-variant of double[] |

```
interface ResolvedTypeDescriptor<T extends C, C> {
    Class<T> resolvedType();
    Class<C> carrierType();
    static <T> ResolvedTypeDescriptor<T,?> of(Class<T> clazz);

// These defaults may be wired into the JVM bytecodes if desired.
    default boolean isInstance(C x) {
        if (this != of(carrierClass())) throw subclassResponsibility();
        return carrierClass().isInstance(x);
    }
    default boolean isAssignableFrom(ResolvedTypeDescriptor<?,?> subDesc) {
        if (this != of(carrierClass())) throw subclassResponsibility();
        return carrierClass().isAssignableFrom(subDesc.resolvedType());
    }
    default T cast(C x) {
        if (this != of(carrierClass())) throw subclassResponsibility();
        return carrierClass().cast(x);
    }
    default T newArray(int length) {
        if (this != of(carrierClass())) throw subclassResponsibility();
        return
        java.lang.reflect.Array.newInstance(carrierClass().getComponentTy
        pe(), length);
    }
    default MethodHandle findVirtual(Lookup lookup, String name,
    MethodTypeDescriptor type) {
        if (this != of(carrierClass())) throw subclassResponsibility();
        return lookup.findVirtual(carrierClass(), name,
        type.asMethodType());
    }
    private static RuntimeException subclassResponsibility() {
        throw new IllegalArgumentException();
    }
    /**
    * Initial entry point called from the VM when a type operator
    * expression must be resolved.
    */
    static <C> ResolvedTypeDescriptor<?,C> initialMetafactory(
    Lookup lookup, TypeDescriptorBootstrapCallInfo<C> bci
    ) throws BootstrapMethodError {
        String descriptor = bci.invocationName();
        Class<C> carrierType = bci.invocationType();
        Class<?> typeOpClass = bci.typeOperatorClass();
        String typeOpName = bci.typeOperatorName();
        List<Object> typeOpArgs = bci.asList();
        ...
    }
}
```

TYPE-CONSTRAINED OPERATIONS FOR PLUG-IN TYPES

INCORPORATION BY REFERENCE; DISCLAIMER

Each of the following applications are hereby incorporated by reference: application Ser. No. 16/515,111, filed on Jul. 18, 2019; application No. 62/801,552, filed on Feb. 5, 2019; application No. 62/699,810, filed on Jul. 18, 2018. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to type constraints. In particular, the present disclosure relates to performing type-constrained operations.

BACKGROUND

Type checking is a process of evaluating and enforcing type constraints. Specifically, type checking determines whether a given type, encountered in source code or compiled code, is valid in the particular context where it is encountered. For example, type checking may determine whether an input to an operation is of an expected type specified for that operation. An operation that requires a particular type may be referred to as a type-constrained operation. In one example, code declares a variable A of type T1. The code further defines a method M that returns a value of type T2. The code attempts to call M and assign the returned value to A. The assignment is a type-constrained operation, because it requires the value returned by M to be of a type that is compatible with A's declared type. Type checking determines whether the assignment is valid, by determining whether type T2 can be cast as type T1. If type T2 can be cast as type T1, then the assignment is valid. If type T2 cannot be cast as type T1, then the assignment is invalid. This example is provided for illustrative purposes only. Many different kinds of type-constrained operations exist. As another example, a type-constrained operation may return a Boolean value that depends on an object's type. Such an operation is considered type-constrained because its return value depends on the result of a type checking operation.

A runtime environment typically includes native instructions (i.e., instructions that are built into the core set of instructions provided by the runtime environment) that are capable of performing type checking for types that are defined within the runtime environment's built-in system of types. For example, in the Java Runtime Environment (JRE), the built-in system of types include basic types (i.e., primitives) and reference types such as classes, interfaces, and arrays. Reference types that are defined within the built-in system of types adhere to the inheritance rules defined in the Java Language Specification and exist within a hierarchy of classes and interfaces.

A runtime environment typically lacks sufficient native instructions to perform type checking for types that are defined outside of the runtime environment's built-in system of types. Types that are defined outside of the runtime environment's built-in system of types are often referred to as static types or compile-time types, because they exist apart from the runtime environment. In some cases, compile-time types may play a role in the runtime environment. Compile-time types that are inspected at runtime, apart from their values, may be called reflected types or reified types. Compile-time types that play a role in defining the processing of their values may be referred to as plug-in types, because they extend or 'plug into' the runtime environment's native system of types, extending the set of operations on values of those native types. For example, the JRE supports source code expressions of the form List<String> and List<Long>, which are referred to as parameterized types. Many different kinds of generic types and parameterized types exist. However, the parameterized types List<String> and List<Long> are not built-in types; they are compile-time types in the Java compiler and reflected types in the JRE. At runtime, the parameterized types are 'erased' to their raw type of List, which is a built-in type. Because the parameterized types are erased to the same raw type, the JRE is unable to distinguish between the parameterized types during type checking. The JRE is unable to perform type-constrained operations for specific compile-time types that may be more specific than the native type List, if the compile-time types are not native classes or interfaces. For example, a method that is declared with a parameter of type List<String> will accept a value of type List<Long>, without constraining the parameter type to the type specified in the method declaration. An inability to distinguish a compile-time type from one or more other types, at runtime, may lead to runtime errors and/or other unexpected behavior.

A runtime environment may check some type constraints in a method after it is loaded but before it is first invoked. For example, the JRE includes a verifier component that inspects the bytecodes of methods and ensures that the types of their inputs and outputs are properly constrained, relative to each other. In the JRE, a bytecode that produces an integer is forbidden to pass its result to a bytecode that requires a floating point number; such code would fail to pass the verifier. The verifier may not be required to check all such type constraints required for correct execution, but may defer some checks to later phases of execution. A runtime environment may check some type constraints for a single instruction the first time it is invoked. For example, the JRE defines a linkage operation for the 'checkcast' bytecode (a bytecode that checks the type of its reference operand), which looks up the class being asserted and ensures that it is a valid class. Linkage operations are often executed by the JRE interpreter, as it encounters previously unexecuted and unlinked instructions. The linkage operations may enforce some type constraints and leave others to actual execution. Type constraint checks that are done on every execution of their instruction may be called runtime checks. Thus, beyond the static type checks performed before the JRE runs, there are layers of additional type checks in the JRE, including verification, linkage, and runtime checks. In order to ensure correct execution, the JRE must distribute type checks through the various phases, with care given to make checks earlier if possible, since runtime checks can be costly.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 illustrates a table of examples of type descriptor strings and corresponding type species according to an embodiment;

FIG. 9 illustrates an example listing of code for an interface type according to an embodiment.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
    2.1 EXAMPLE CLASS FILE STRUCTURE
    2.2 EXAMPLE VIRTUAL MACHINE ARCHITECTURE
    2.3 LOADING, LINKING, AND INITIALIZING
3. PERFORMING TYPE-CONSTRAINED OPERATIONS FOR PLUG-IN TYPES
3.1. CONSTANT POOL OPERATIONS USING PLUG-IN TYPES
4. MISCELLANEOUS; EXTENSIONS
5. HARDWARE OVERVIEW
6. COMPUTER NETWORKS AND CLOUD NETWORKS

1. General Overview

One or more embodiments include techniques for performing type-constrained operations for plug-in types. A runtime environment encounters a request to perform a type-constrained operation that requires evaluating a type constraint associated with a particular plug-in type. The runtime environment includes native instructions that are capable of evaluating type constraints associated with a system of built-in types supported by the runtime environment. The runtime environment lacks sufficient native instructions to evaluate type constraints associated with plug-in types that are defined outside of the system of built-in types. The runtime environment accesses a plug-in type framework to obtain a particular type descriptor instance associated with the particular plug-in type. Prior to encountering any request to perform the type-constrained operation, the plug-in type framework is designated to the runtime environment for obtaining type descriptor instances. The type descriptor instances define, to the runtime environment, constraints on plug-in types to an extent that any such constraints exist. The particular type descriptor instance defines a particular type constraint that does not match any single built-in type in the system of built-in types. The runtime environment performs the type-constrained operation, which involves using the particular type descriptor instance to evaluate the particular type constraint associated with the particular plug-in type.

One or more embodiments described in this Specification and/or recited in the claims may not be included in this General Overview section.

2. Architectural Overview

Figure 1:
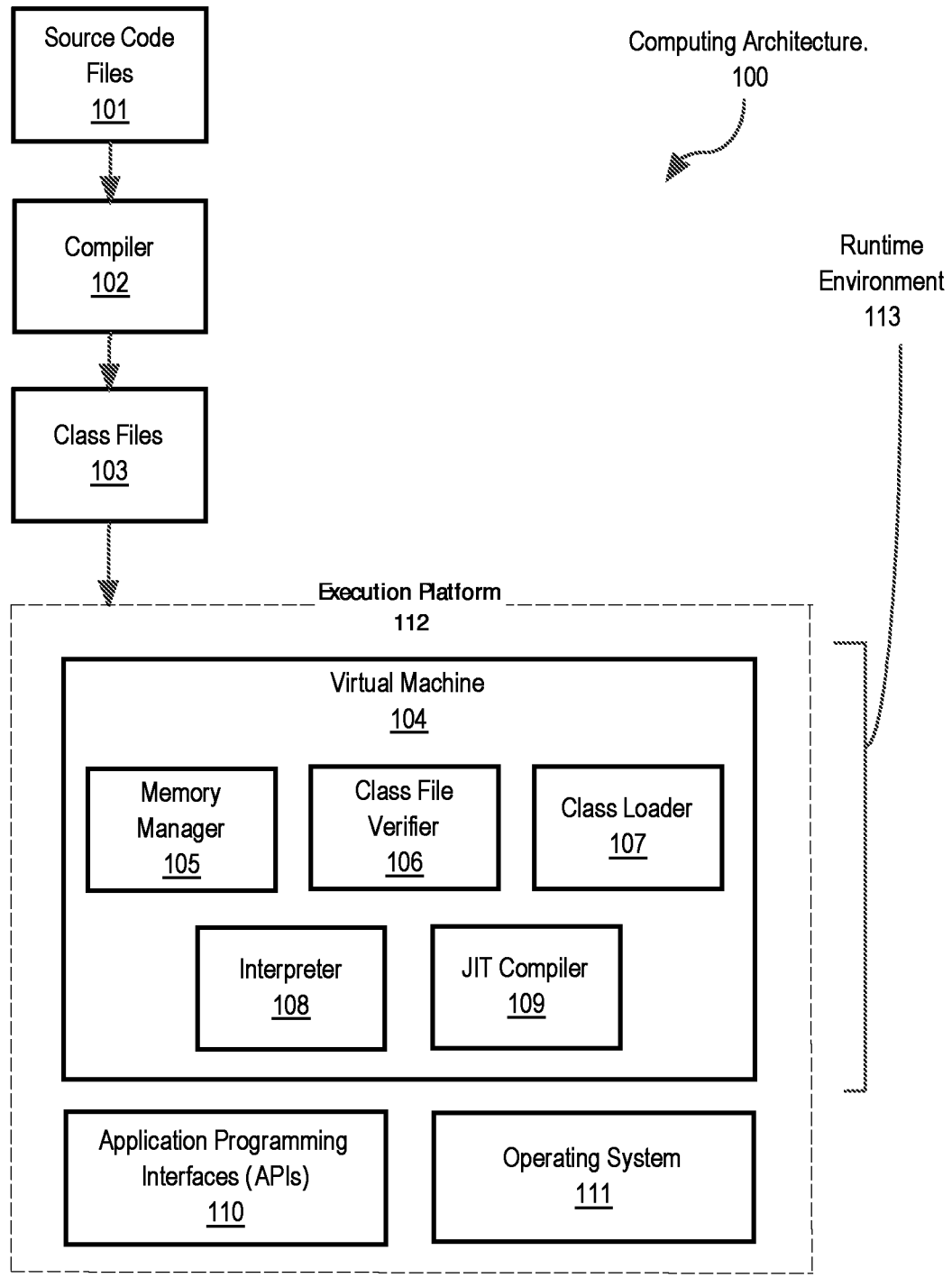
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the logical, human-readable, function-driven form used by the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code (i.e., without additional processing required to determine which data structures to use and which steps to use of those available to the virtual machine). Converting source code to virtual machine instructions includes mapping source code functionality from the language to virtual machine functionality that utilizes underlying resources, such as data structures. Often, functionality that is presented in a logical, human-readable, function-driven form via source code by the programmer is converted into more complex machine-centric steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code avoids this cost penalty at run-time to improve run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. In many dynamic languages (such as Java), the language is designed to allow code to be inserted during the program's execution such that compilation ahead-of-time can lead to inefficiencies. When a program is interpreted, the code of the program is read line-by-line and converted to machine-level instructions while the program is executing. As a result, the program has a shorter startup time (as compared with code that is loaded and compiled in full before execution begins, since it can begin executing without the delay of loading and compiling in full), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. In some examples, programs spend a disproportionate amount of time executing a small portion of a larger body of executing code. For this reason, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In one example, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

In the following example, each of the class files 103 represents a respective "class" defined in the source code files 101 (or dynamically generated by the compiler 102/virtual machine 104). However, in other examples, the class file may represent multiple classes, depending on a variety of factors. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
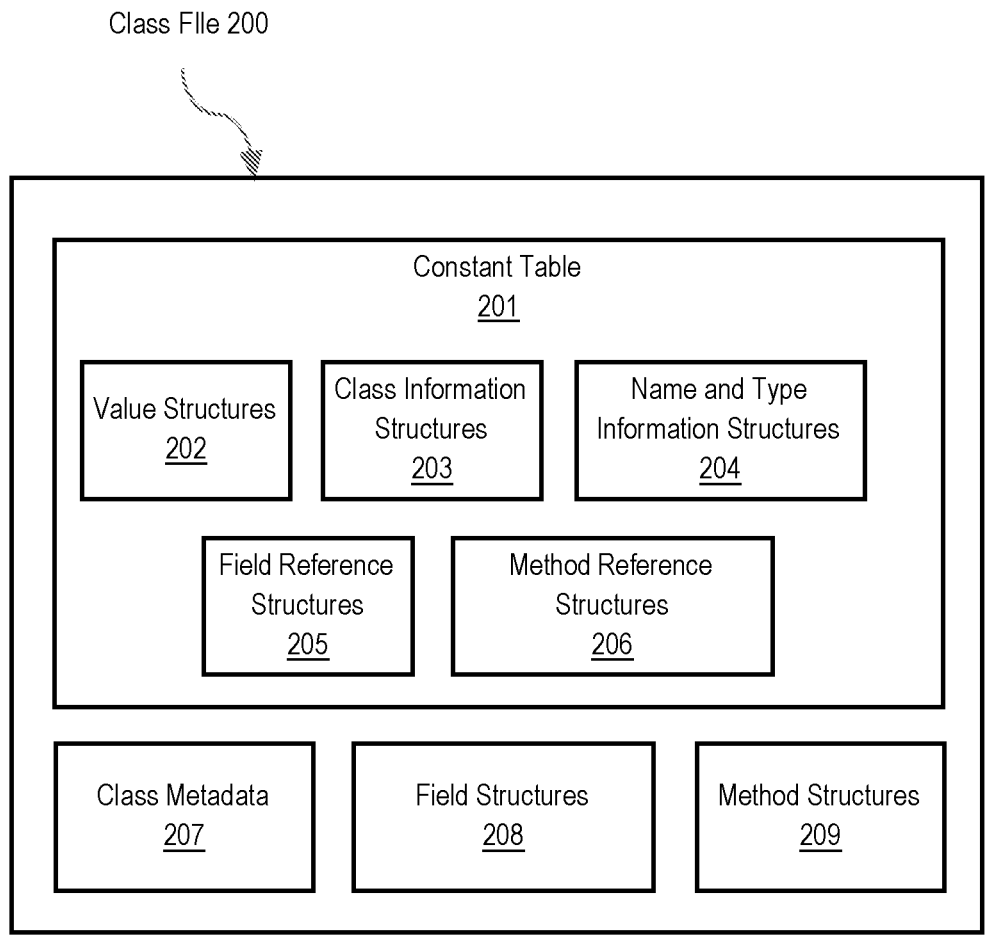
FIG. 2 is a block diagram illustrating an embodiment of a computer system suitable for implementing methods and features described herein.

FIG. 2 illustrates an example structure for a class file 200 in block diagram form according to an embodiment. In one example, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. A symbol table is a data structure that stores information about each symbol (i.e., identifier) that appears in source code. In a class file 200, the constant table 201 stores information about identifiers that appear in the source code for that class. A linker may rely on entries in the constant table 201 to resolve the identifiers. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth. In object-oriented programming, a subclass is a class that extends another class, which is referred to as its superclass. A subclass inherits functionality of its superclass, such as fields, methods, interfaces, etc. In addition, a subclass may introduce additional functionality and/or override functionality inherited from a superclass. A system of superclasses and subclasses may be referred to as an inheritance hierarchy or "tree." A superclass may be referred to as a "parent" or "ancestor" class of a subclass, and a subclass may be referred to as a "child" or "descendent" class of a superclass.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the base name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the (ParameterDescriptor) is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, accesses to constant values are shown in the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 supports a variety of run-time environments, regardless of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
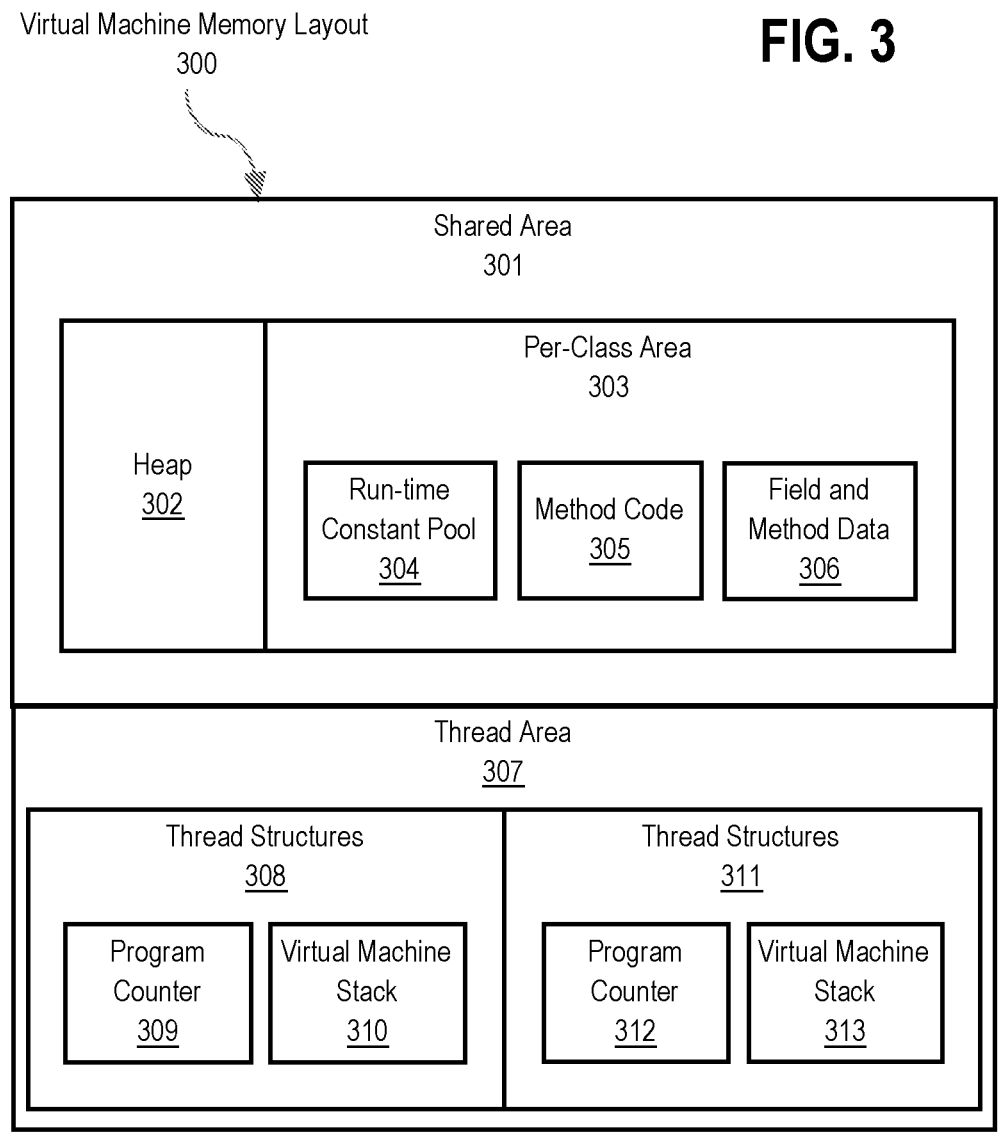
FIG. 3 illustrates an example virtual machine memory layout in block diagram form according to an embodiment.

FIG. 3 illustrates an example virtual machine memory layout 300 in block diagram form according to an embodiment. In one example, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In one example, the thread area 307 depicted in FIG. 3 assumes two threads are executing on the virtual machine 104. However, in a practical environment, the virtual machine 104 may execute any number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
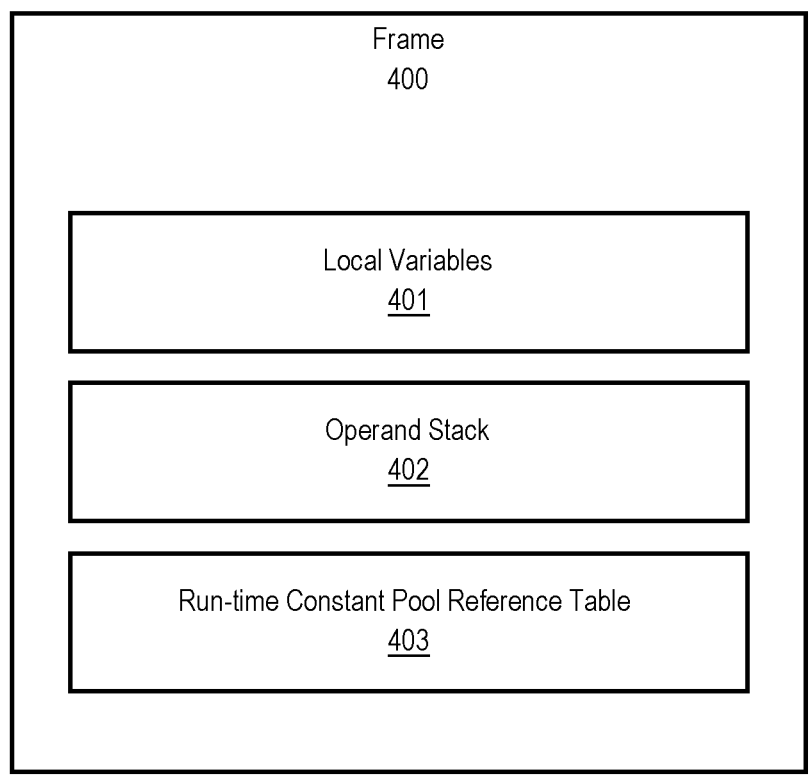
FIG. 4 illustrates an example frame in block diagram form according to an embodiment.

FIG. 4 illustrates an example frame 400 in block diagram form according to an embodiment. In the remaining examples, frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses. For symbols that reference other classes, the resolution mechanism may load classes as necessary to resolve symbols that have not yet been defined or resolved. In addition, the resolution mechanism translates variable accesses into appropriate offsets into storage structures associated with the run-time locations of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily" or on an as-needed basis) one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class (i.e., the class currently under evaluation by the class verification mechanism, when such mechanism is in place and running, as it traverses through evaluation of different classes) has correct access permissions for classes/fields/structures referenced in the constant pool 304, check that the virtual machine 104 code of methods will not cause unexpected behavior based on an expressed form of preferences by the programmer, in code, as the code was initially written (e.g., making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution on an as-needed basis, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Performing Type-Constrained Operations for Plug-In Types

As discussed above, in a traditional Java environment, a method that is declared with a parameter of type List<String> will accept a value of type List<Long>, without constraining the parameter type to the type specified in the method declaration. An inability to distinguish a compile-time type from one or more other types, at runtime, may lead to runtime errors and/or other unexpected behavior. If both compile-time types List<String> and List<Long> were instead represented as plug-in types in the runtime environment, the runtime environment could make accurate distinctions between values of those distinct List types. In that case, the native type List would be constrained differently by the two different plug-in types List<String> and List<Long>, in such a way that values of the distinct plug-in types would not be confused, even though the associated native type is only List, without distinction.

Figure 5:
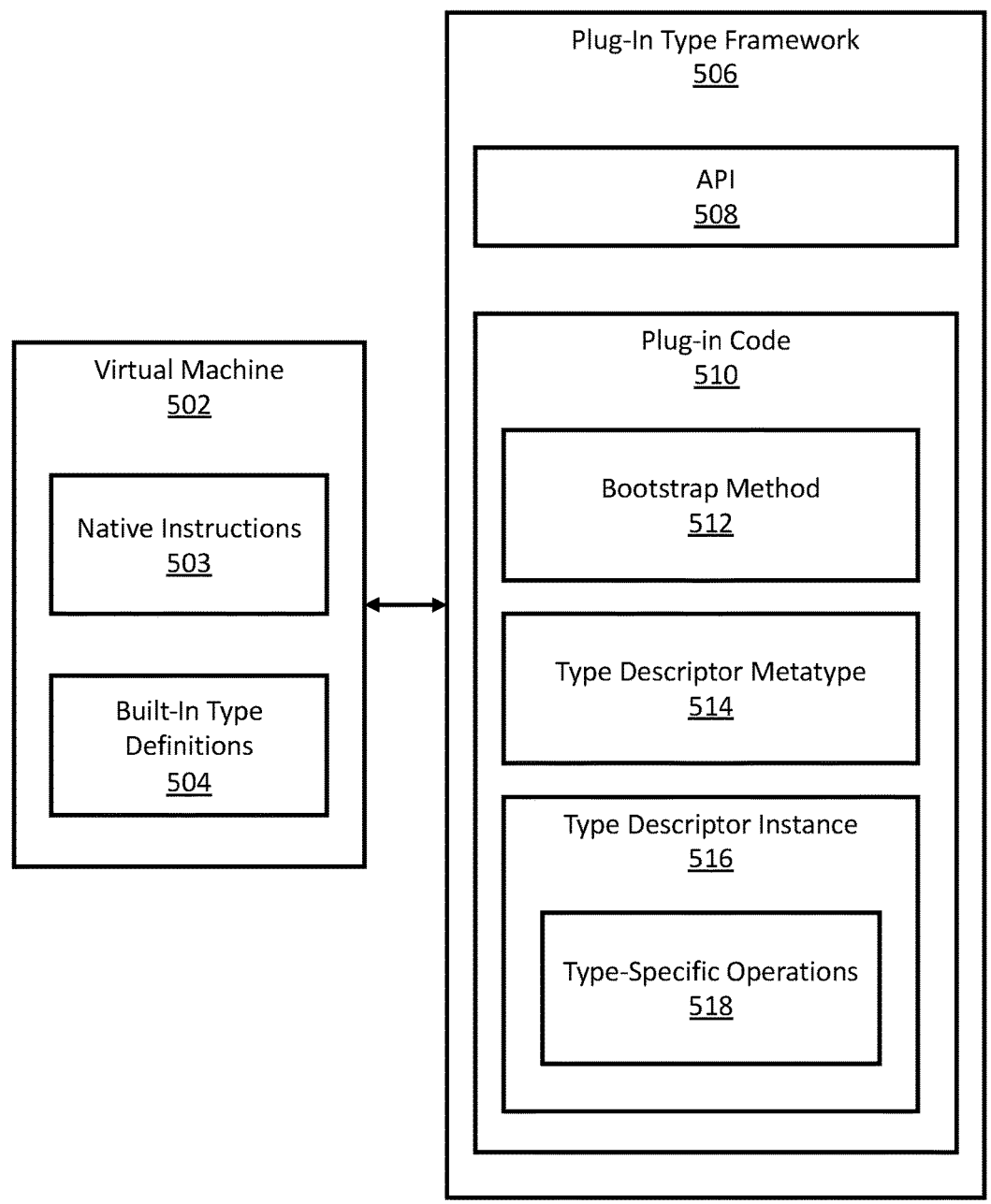
FIG. 5 illustrates a runtime environment in accordance with one or more embodiments.

FIG. 5 illustrates a runtime environment 500 in accordance with one or more embodiments. As illustrated in FIG. 5, the runtime environment 500 includes a virtual machine 502, a plug-in type framework 506, and various components thereof. In one or more embodiments, the runtime environment 500 may include more or fewer components than the components illustrated in FIG. 5. The components illustrated in FIG. 5 may be local to or remote from each other. The components illustrated in FIG. 5 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, the virtual machine 502 operates as described above. The virtual machine 502 is capable of running on top of a variety of particular machine environments and executes virtual machine instructions such as bytecode. At runtime, the virtual machine 502 loads types based on a set of built-in type definitions 504. The built-in type definitions 504 correspond to a system of built-in types that are natively supported by the virtual machine 502. The built-in type definitions 504 may include definitions for primitive types and/or reference types. Reference types may include classes, interfaces, arrays, and/or any other type for which, when an object of that type is instantiated at runtime, the object is accessed by a handle or reference to the object's location in memory. Reference types that are defined within the built-in system of types adhere to the inheritance rules defined in the runtime environment's 500 corresponding language specification and exist within a type hierarchy. The virtual machine 502 includes native instructions 503 that are capable of performing type checking for types in the built-in system of types.

In an embodiment, the runtime environment 500 includes a plug-in type framework 506. The plug-in type framework 506 includes an application programming interface (API) 508 that exposes one or more functions and/or interfaces of the plug-in type framework 506. A set of plug-in code 510 uses the API 508 to implement operations for evaluating type constraints associated with one or more plug-in types. The plug-in code 510 is not part of the core set of native instructions provided by the runtime environment 500. Rather, the plug-in code 510 is designed to extend or 'plug into' the runtime environment 500 and provide support for plug-in types to the virtual machine 502. As described below, the plug-in type framework 506 is designated to obtain type descriptor instances that define constraints on plug-in types. The plug-in type framework 506 may be designated natively, upon initializing the runtime environment 500, such that the plug-in code 510 is available to the virtual machine 502 throughout runtime.

A plug-in type system (e.g., using a plug-in type framework 506) may have the effect of inserting type constraint checks at any point. In the JRE, a plug-in type system may insert non-native type constraint checks in the verifier, in the linkage logic, at runtime, and/or at one or more other points. In order to correctly execute such checks, the plug-in type system must represent types in a format consistent with the JRE module performing the check. Thus, since the verifier works primarily with resolvable symbolic type descriptors, a plug-in type in the verifier will appear as an enhanced form of resolvable symbolic type descriptor. Similarly, since the linkage logic resolves type descriptors to resolved runtime types (which may be "metaobjects"), a plug-in type that operates at link-time must be ready to translate an enhanced resolvable symbolic type descriptor into a corresponding runtime type descriptor instance (which may be a non-native "metaobject") for a plug-in type. In addition, in an embodiment, a plug-in type must be ready to perform a link-time query to that type descriptor instance. Proper execution of runtime type constraints for a plug-in type may require the JRE to perform runtime queries to a type descriptor instance. Proper enforcement of plug-in type constraints, in a layered system like the JRE, may require spreading the logic of the plug-in type through all of the relevant execution phases, making resolved symbolic descriptors or type descriptor instances available as needed to answer appropriate queries about their type constraints.

In an embodiment, the plug-in code 510 includes a bootstrap method 512. The bootstrap method 512 is a function or operation that, when called with the appropriate parameter(s), returns a type descriptor instance 516. The type descriptor instance 516 is a particular metaobject, which may be an instance of a type descriptor metatype 514. Each type descriptor instance 516 corresponds to a particular plug-in type. Specifically, a type descriptor instance 516 supplies type-specific operations 518 for the corresponding plug-in type. The type-specific operations 518 include operations for evaluating type constraints for that plug-in type. In an embodiment, the type-specific operations 518 implement one or more constraints that do not match the constraint(s) of any single built-in type. Compared with any single built-in type, considering the universe of all possible type-constrained operations, the plug-in type's constraint(s) would yield a different result in at least one type-constrained operation. Functionally, the plug-in type is not merely a restatement or refactoring of a built-in type.

In an embodiment, the plug-in type framework 506 does not include individual type definitions (e.g., class files) for each particular plug-in type. A particular type descriptor metatype 514 may include operations that are capable of instantiating multiple type descriptor instances corresponding, respectively, to different plug-in types. For example, the type descriptor metatype 514 may have overloaded constructors or factories, where each constructor or factory instantiates a type descriptor instance 516 corresponding to a different plug-in type. A constructor or factory of a type descriptor metatype 514 may accept one or more parameters whose varying values may select correspondingly varying plug-in types, as a single-parameter constructor or factory for a List<*> plug-in type may accept the value Long to select the plug-in type List<Long> or at another time may accept the value String to select the plug-in type List<String>. The plug-in type framework 506 may include multiple type descriptor metatypes 514. Each type descriptor metatype 514 may be capable of producing one or more different type descriptor instances 516. For example, a single type descriptor metatype 514 may have parameterized constructors or factories for generating type descriptor instances 516 corresponding to multiple non-nullable types. In this manner, the plug-in type framework 506 may support an arbitrary number of plug-in types, without requiring separate type definitions for each plug-in type. The runtime environment 500 is not required to load each different plug-in type, thus reducing system overhead that would otherwise be required to implement plug-in types. Alternatively or in addition, this approach may allow for plug-in types to serve as constrained views on built-in types, without requiring a separate type definitions for each variant of such constraints.

In an embodiment, the plug-in type framework 506 includes a single bootstrap method 512. A single bootstrap method 512 may serve as a global entry point for instantiating the appropriate type descriptor metatype(s) 514 for each plug-in type. The virtual machine 502 may call the bootstrap method 512 with the requisite argument(s) (i.e., the argument(s) specified by the bootstrap method 512 for designating a particular plug-in type) and the bootstrap method 512 may determine, based on the argument(s), which type descriptor metatype 514 to use (or, if there a type descriptor metatype 514 that supports multiple plug-in types, which argument(s) to supply when instantiating the type descriptor metatype 514). Alternatively, the plug-in type framework 506 may include multiple bootstrap methods 512, each responsible for returning instances of one or more type descriptor metatypes 514.

In an embodiment, although the plug-in type framework 506 does not include separate type definitions for each plug-in type, each type descriptor instance 516 corresponds to a particular plug-in type. Each type descriptor instance 516 reports, when queried and/or inspected, a built-in type that the type descriptor instance 516 constrains. The reported built-in type is called the type descriptor instance's 516 carrier type. In addition, the type descriptor instance 516 may report a symbolic type descriptor that uniquely represents the plug-in type. The symbolic type descriptor may be returned as a string, or may be castable as a string, in a particular syntax. For ease of discussion, the symbolic type descriptor is referred to herein as a "type descriptor string."

In an embodiment, a type descriptor string serves as an resolvable symbolic reference to its corresponding plug-in type, in contexts (such as a class file) or execution phases (such as the verifier) that (1) require such references but (2) do not require a 'live' reference to a type descriptor instance or metaobject. A static compiler may insert a type descriptor string into its output class file, for later resolution into a type descriptor instance. A type descriptor string, (whether encountered in a class file, obtained from a type descriptor instance, or encountered or obtained at some other location) may undergo a standard linkage process to resolve it to a type descriptor instance that corresponds to the same plug-in type. A bootstrap method may be invoked to perform this resolution operation, if the type descriptor string itself does not provide the resolution operation.

In an embodiment, a type descriptor string uses a particular syntax. The particular syntax used for the type descriptor string may be an extension of a syntax used to represent type descriptor strings for built-in types, as described above. The following listing is an example of a syntax that may be used to represent type descriptor strings. In this example, the asterisks are not part of the syntax but denote productions that support plug-in types, as an extension of the syntax used for built-in types.

MethodType: '(' (FieldType)* ')' (FieldType | 'V')
FieldType: PrimitiveType | ArrayType | ObjectType | *TypeExpr
PrimitiveType: 'B' | 'C' | 'D' | 'F' | 'I' | 'J' | 'S' | 'Z'
ArrayType: '[' (PrimitiveType | ArrayType | ObjectType)
ObjectType: 'L' ClassName ';'
*TypeExpr: TypeCarrier '/' (TypeOpName)? (';' | '[' (TypeArg)+ ']' )
*TypeCarrier: FieldType | 'L'
*TypeOpName: '$' Identifier | ('L' ClassName) ('/' ';' '$' Identifier)?
*TypeArg: FieldType | 'V' | MethodType | NameArg
*NameArg: '$' (any character except '.' ';' '[' '/')+ ';'

In an embodiment, for a given type descriptor string, the portion that corresponds to a built-in type may be identified with the plug-in type's carrier type. The plug-in type, designated by the extended syntax, may be considered a constrained overlay or view of the carrier type. The carrier type may be viewed as a supertype (e.g., a superclass in the Java programming language) of the plug-in type, even though the plug-in type does not explicitly extend the carrier type and is defined outside the type hierarchy of the system of built-in types. The runtime environment may freely convert a plug-in type to its carrier type (i.e., cast an object from the plug-in type to its carrier type) without accessing reflective operations of the plug-in type. However, the runtime environment may not convert from the carrier type to the plug-in type without accessing reflective operations of the plug-in type (via the corresponding type descriptor instance for that plug-in type) to confirm that the conversion is permitted by the plug-in type's constraints.

In the example above, the productions that are not marked by an asterisk represent the carrier type. A given 'TypeExpr' describes a plug-in type that is distinct from any built-in type and any plug-in type that reports a different type descriptor string. 'TypeCarrier,' corresponds to the carrier type, i.e., the portion of the syntax that supports built-in types. 'TypeOpName' corresponds to a type operator, represented as a name and/or other simple identifier. A sequence of zero or more 'TypeArgs' correspond to zero or more type arguments, which may include one or more type descriptors and/or other constants. One or more of these semantic elements ('TypeCarrier', 'TypeOpName', and 'TypeArg') may be optional. If 'TypeCarrier' is omitted, the carrier type may be designated as a top-level object (e.g., java.lang.Object). If 'TypeOpName' is omitted, the type operator may be derived from the carrier type. 'TypeArg' may be omitted for a plug-in type that does not have any arguments.

In an embodiment, a type descriptor string may represent a reified generic type, i.e., a generic type that is not subject to erasure at runtime. For example, a plug-in type may be represented in source code as 'Map<int, String>'. A type descriptor string for this plug-in type may have a carrier type of Map, no type operator, and arguments corresponding to the types int and String. This type descriptor string would be distinguishable, at verification time, link time, and runtime, from a different type descriptor string corresponding to the reified generic type of 'Map<int, Long>'.

In an embodiment, a type descriptor string may represent a type with a wildcard argument. For example, a plug-in type may be represented in source code as 'List<?>'. A type descriptor string for this plug-in type may have no type operator and a single argument of the symbol '?'. This type descriptor string would be distinguishable, at verification time, link time, and runtime, from a different type descriptor string corresponding to the raw type of 'List'. A plug-in type that accepts wildcard argument may be considered broader than any single built-in type, because the plug-in type supports as many variations of type constraints as possible inputs to the wildcard argument.

In an embodiment, a type descriptor string may represent a non-nullable reference, i.e., a plug-in type that does not accept null values. For example, a plug-in type may be represented in source code as 'String!'. A type descriptor string for this plug-in type may have a carrier type of String and a type operator of '!' or 'java/lang/NotNull'. This type descriptor string would be distinguishable, at verification time, link time, and runtime, from the type descriptor string corresponding to the built-in type of 'String'. A verifier may allow a value of type 'String!' to be assigned to a variable of type 'String', simply by observing that the type 'String' is a carrier type of the type 'String!'. A verifier may forbid the reverse conversion, on the grounds that an explicit runtime operation is required to enforce the constraint that 'String!' cannot be null.

In an embodiment, a type descriptor string may represent a nullable value. For example, a plug-in type may be represented in source code as 'Point?', where Point is not a nullable reference type but rather a value type that does not permit null. A type descriptor string for this plug-in type may have a carrier type that defaults to the built-in top-level type 'java.lang.Object', a type operator of the symbol '?' or the type 'java/lang/Nullable', and a single argument corresponding to the value type 'Point'. This type descriptor string would be distinguishable, at verification time, link time, and runtime, from the type descriptor string corresponding to the value type of 'Point'. A verifier may allow a value of type 'Point?' to be assigned to 'Object', since the type 'Point?' has a carrier type of 'Object', but the verifier may forbid the reverse conversion, on the grounds that an explicit runtime operation is required to enforce the constraint that the 'Object' is non-null and refers to a 'Point' instance.

In an embodiment, a type descriptor string may represent a reified intersection, i.e., a type that corresponds to the intersection of two other types and is not subject to erasure at runtime. For example, a plug-in intersection type may be represented in source code as 'I&J'. A type descriptor string for this plug-in type may have a carrier type of I, a type operator of the symbol '&', and a single argument corresponding to the type 'J'. This type descriptor string would be distinguishable, at verification time, link time, and runtime, from the type descriptor string corresponding to any other intersection type.

In an embodiment, a type descriptor string may represent a reified union, i.e., a type that corresponds to the union of two other types and is not subject to erasure at runtime. For example, a plug-in union type may be represented in source code as 'I|J'. A type descriptor string for this plug-in type may have a carrier type of a common supertype of 'I' and 'J', a type operator of the symbol '|', and a single argument corresponding to the type 'J'. This type descriptor string would be distinguishable, at verification time, link time, and runtime, from the type descriptor string corresponding to any other union type. The type constraints enforced by reified intersections and reified unions may be seen as combination constraints, because they combine the type constraints of two or more built-in types. A combination constraint may be seen as being constrained, in combination, by those built-in types.

In an embodiment, a type descriptor string may represent a fixed-length array. For example, a plug-in type may be represented in source code as 'double[5]'. A type descriptor string for this plug-in type may have a carrier type of the array type 'double[ ]', a type operator of 'Array.length', and a single argument of the constant '5'. This type descriptor string would be distinguishable, at verification time, link time, and runtime, from the type descriptor string corresponding to the unbounded array type 'double[ ]'.

In an embodiment, a type descriptor string may represent a type with a range constraint. For example, a plug-in type may accept only non-negative values. A type descriptor string for this plug-in type may have a carrier type of the built-in primitive type 'int', a type operator of 'Integer.interval', and the arguments 'ge' and '0'. This type descriptor string would be distinguishable, at verification time, link time, and runtime, from the type descriptor string corresponding to the built-in primitive type 'int'.

In an embodiment, a type descriptor string may represent a null or unreached type token. For example, a reference may be constrained to be null and/or never delivered to its consumer (i.e., the type constraint always fails). A type descriptor string for this plug-in type may have a carrier type that defaults to the built-in top-level type 'java.lang.Object' and a type operator of 'java/lang/Null' or 'java/lang/NotReached'. This type descriptor string would be distinguishable, at verification time, link time, and runtime, from the type descriptor string corresponding to an object that accepts non-null values.

FIG. 6 illustrates a table 600 of examples of type descriptor strings, and their corresponding type species, expressed in the example syntax describe above. The examples in FIG. 6 are provided for illustrative purposes only and should not be construed as limiting one or more embodiments. In FIG. 6, the last four rows of the table 600 illustrate examples of nesting type descriptor strings in accordance with an embodiment. For example, the type descriptor string 'L/LFoo[LBar; /$N;] corresponds to a type that is derived first from 'Bar' by modifying 'Bar' with 'N', and then passing that modified type to the parameterized type factory associated with the type 'Foo'. The resulting plug-in type has a carrier type of 'java.lang.Object'. The last two rows of the table 600 illustrate examples of combining type operators. In an embodiment, two type descriptors that include the same type operators in different orders are treated as distinct plug-in types, because the raw symbolic values of the type descriptor strings are different. The runtime environment treats the type descriptor strings as corresponding to different types even if the types are functionally equivalent.

Figure 7:
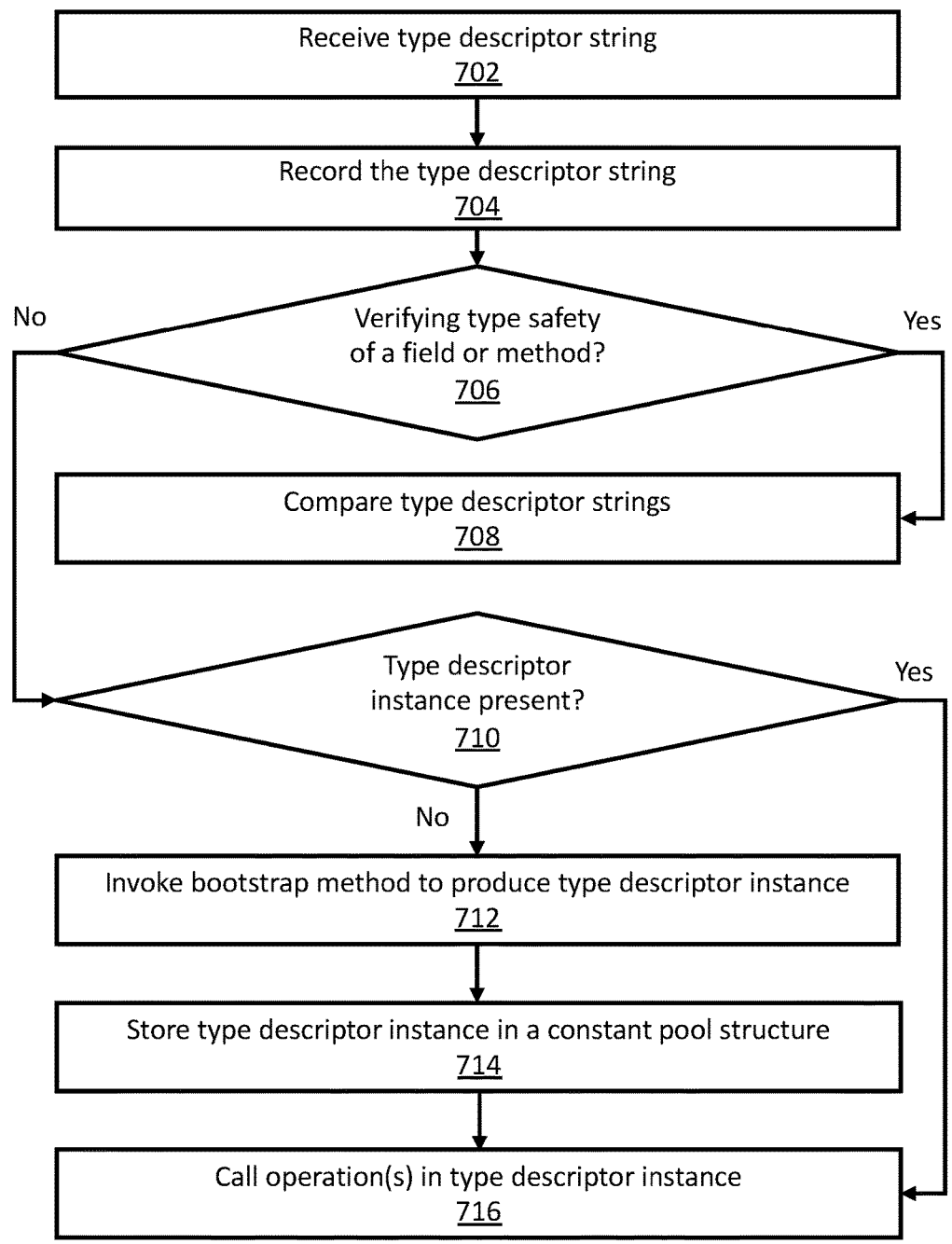
FIG. 7 illustrates an example set of operations for handling a reference to a plug-in type according to an embodiment.

FIG. 7 illustrates an example set of operations for handling a reference to a plug-in type in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments.

In an embodiment, the runtime environment receives a type descriptor string (Operation 702) for a particular plug-in type, from a class file or a type descriptor instance, and records the type descriptor string (Operation 704). As described in further detail below, during type checking, the runtime environment may verify type safety of code by comparing two types, at least one of which may be a plug-in type. Specifically, the runtime environment may compare previously recorded type descriptor strings for those types in their raw symbolic forms, without calling a bootstrap method or calling any operation of the type descriptor instance. Although the runtime environment is able to perform such comparisons, the runtime environment's native code does not include sufficient functionality to generate type descriptor strings for plug-in types. In addition, the runtime environment lacks sufficient native instructions to perform type-specific reflective operations for plug-in types, as described herein. Therefore, the runtime environment lacks sufficient native instructions to perform type-constrained operations for plug-in types. Plug-in code supplies the instructions necessary to generate and/or resolve the type descriptor strings for plug-in types and perform type-specific operations relating to verification, linking, runtime constraint checking, reflection, construction of further plug-in types, and/or some other operation(s) relevant to correctly performing type checking in the runtime environment.

In an embodiment, the manner in which the runtime environment handles a reference to a plug-in type depends on the context in which the runtime environment encounters the reference. If the runtime environment is verifying type safety of a field or method (Operation 706), the runtime environment may simply compare type descriptor strings (Operation 708) as described above. For example, when executing a 'putfield' instruction to a field whose type is 'List<String>', the verifier may simply note that there is a 'List<String>' on the stack and store down to the field, exactly as if the stacked value and field were of the built-in type 'List'. Likewise, the linkage of such a 'putfield' may only need to note that the field is properly declared in the target class, with exactly the same type descriptor string. In such cases, the verifier and linker are not concerned with what constraint 'List<String>' enforces on 'List'. The verifier and linker treat the plug-in type as a separate version of the plug-in type's built-in type, constrained in some way known to an absent type descriptor instance.

In an embodiment, other type-constrained operations (i.e., other than verifying type safety of a field or method) may require that the runtime environment call one or more operations (e.g., a method or function) in the type descriptor instance corresponding to that particular type. For example, the runtime environment may be required to call one or more query operations of a type descriptor instance to determine whether an object can be cast as the particular plug-in type, determine whether an object is an instance of the particular type, cast an object as the particular type, generate an array of objects of the particular plug-in type, and/or resolve linkage to a method of the particular type. In an embodiment, the runtime environment determines whether the necessary type descriptor instance is already present (Operation 710). The type descriptor instance may be considered present if it has been instantiated and is available to query. If the type descriptor instance is not already present to respond to such a query operation, a bootstrap method may be invoked (Operation 712) to produce a type descriptor instance by resolving the type descriptor string. The runtime environment may store a type descriptor instance in a constant pool structure (Operation 714), so that the type descriptor string only needs to be resolved once per constant pool. The runtime environment calls one or more operations (e.g., method or function) in the type descriptor instance, as needed to perform the type-constrained operation (Operation 716).

Figure 8:
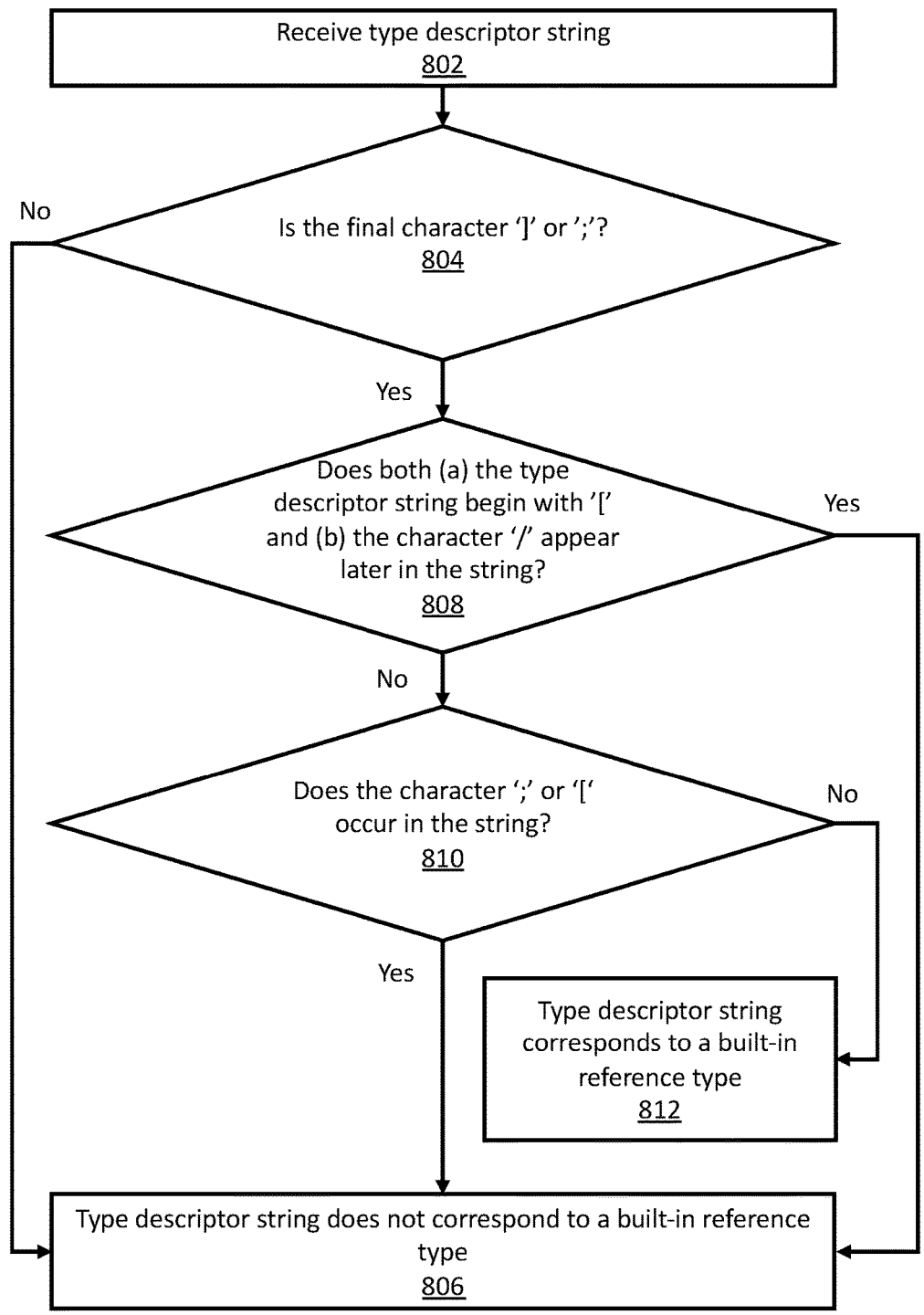
FIG. 8 illustrates an example set of operations for inspecting the characters in a type descriptor string according to an embodiment.

In an embodiment, the runtime environment also uses a plug-in type's type descriptor string as the corresponding type name (e.g., class name) for that plug-in type. To distinguish between a type descriptor string for a built-in reference type and a type descriptor string for a plug-in type, the runtime environment may inspect the characters in the type descriptor string. FIG. 8 illustrates an example set of operations for inspecting the characters in a type descriptor string in accordance with one or more embodiments. One or more operations illustrated in FIG. 8 may be modified, rearranged, or omitted all together. Accordingly, the particular sequence of operations illustrated in FIG. 8 should not be construed as limiting the scope of one or more embodiments.

In this example, in a Java environment using the example syntax above, a type name is not permitted to contain the character '[' unless it is an array type name. In an array type name, the '[' character is not permitted to follow the character '/'. After receiving a type descriptor string (Operation 802), the runtime environment may check whether the final character in the type descriptor string is ']' or ';' (Operation 804). If not, then the runtime environment determines that the type descriptor string does not correspond to a built-in reference type (Operation 806); the type descriptor string must correspond to either a plug-in type or an erroneous string. If the final character is ']' or ';', then the runtime environment determines whether (a) the type descriptor string begins with the character '[' and (b) the character '/' appears later in the string (Operation 808). If both (a) and (b) are true, then the runtime environment determines that the type descriptor string does not correspond to a built-in reference type (Operation 806); the type descriptor string must correspond to either a plug-in type or an erroneous string (Operation 806). If either (a) or (b) is false, then the runtime environment searches the string to see if the character ';' or '[' occurs in the string (Operation 810). If either character occurs in the string, then the runtime environment determines that the type descriptor string does not correspond to a built-in reference type (Operation 806); the type descriptor string must correspond to either a plug-in reference type or an erroneous string. If neither character occurs in the string, then the runtime environment determines that the type descriptor string corresponds to a built-in reference type (Operation 812).

Alternatively, in an embodiment, the runtime environment parses the entire type descriptor string, according to the syntax, and determine whether the '/' character (or some other character that denotes the beginning of syntax corresponding to a plug-in type) is encountered before the end of the string. A constant pool may have a CONSTANT_Class entry that resolves to a metaobject of a built-in metatype when it is resolved from a built-in type descriptor recognized by the runtime environment, and another CONSTANT_Class entry that resolves to a metaobject of a metatype defined by a plug-in type API, when it is resolved from a plug-in type descriptor string not native to the runtime environment.

As noted above, some type-constrained operations may require reflective access to a built-in type. In an embodiment, in such cases, the runtime environment first obtains a resolved type descriptor instance. To obtain a resolved type descriptor instance, the runtime environment may consult a constant pool or call a bootstrap method associated with the plug-in type. The runtime environment and/or plug-in type framework may determine which bootstrap method to call based at least in part on the built-in type's carrier type and type operator. Alternatively, a single bootstrap method may serve as a global entry point for obtaining type descriptor instances. The plug-in type's type argument(s), if any, may be supplied as input to the bootstrap method. Alternatively or in addition, contextual data may be supplied as input to the bootstrap method, such as the current type, the carrier type, the type operator type or symbol, and/or the unresolved type descriptor string. In response, the bootstrap method returns a type descriptor instance corresponding to the plug-in type. The runtime environment then calls one or more reflective operations of the type descriptor instance. The reflective operation(s) return(s) one or more values that the runtime environment uses to perform a type-constrained operation. For example, when invoking the 'get' method on a plug-in type 'List<String>', the type descriptor instance of 'List<String>' is queried about its 'get' operation. The type descriptor instance returns a handle that may be cached in a constant pool and/or used directly to form a method call. The built-in metaobject for 'List' need not be directly queried in this case, although the type descriptor instance of 'List<String>' may recursively query its carrier type 'List' to help it locate a suitable untyped version of the requested 'get' method.

In an environment, plug-in types may be assigned different 'kinds' corresponding to different categories of types that operate differently at runtime. For example, different kinds of plug-in types may include value types and reference types. A value type is a type that directly contains its value, whereas the contents of an instance of a reference type are accessible only via a handle or reference to the instance's location in memory. Primitive types, defined within the system of built-in types, are value types. The value null is compatible with all reference types, unless constrained by a plug-in type, such as in the example of 'String!' provided herein, but is incompatible with all value types. In an embodiment, the syntax for plug-in types is further extended to include one or more productions that designate a plug-in type's kind, such as plug-in value type, plug-in reference type, or some other kind of plug-in type. Supporting multiple kinds of plug-in types may allow for improved interoperability of plug-in types with built-in types.

As noted above, type descriptor instances are defined according to an API of the plug-in type framework. In an embodiment, the API includes an interface type that each type descriptor metatype must implement. The interface type indicates the structures and operations needed for each type descriptor instance to support type-constrained operations for the corresponding plug-in type. FIG. 9 illustrates an example listing of code 900 for an interface type, using the Java programming language. The example shown in FIG. 9 is provided for illustrative purposes only and should not be construed as limiting one or more embodiments.

In an embodiment, the plug-in type framework's API, including the interface type, is merged into an API of the runtime environment that supports built-in types. In other words, the plug-in type framework's API may be part of the system of built-in types, even though specific type descriptor metatypes and type descriptor instances are not part of the system of built-in types. The interface type API may define an operation to map a plug-in type to its nearest proper supertype in the system of built-in types. Alternatively or in addition, the runtime environment may define an operation to determine whether a type is a plug-in type. Alternatively, in an embodiment, the plug-in type framework's API is kept separate from an API of the runtime environment that supports built-in types. Keeping the API's separate may help maintain a clean distinction between built-in types and plug-in types. However, keeping the API's separate may require replication of operations needed by both API's. In some execution contexts or API's, a plug-in type may be allowed to masquerade as a built-in type. For example, the reflective type 'java.lang.Class' can reflect any built-in type. For purposes of managing verification, linkage, reflection, or calls to bootstrap methods, the system may allow a special instance of 'java.lang.Class' to represent a plug-in type like 'List<String>' rather than a true built-in type like 'List'.

3.1. Constant Pool Operations Using Plug-in Types

In an embodiment, a constant pool stores symbolic references to type members such as fields and methods. The following discussion uses examples from a Java environment. However, similar concepts may apply to different environments and these examples should not be construed as limiting one or more embodiments.

In a Java environment, a constant pool may store a CONSTANT_Fieldref, which is a symbolic reference to a field in a given class. Alternatively or in addition, a constant pool may store a CONSTANT_Methodref, which is a symbolic reference to a method of a given class. A symbolic reference may be stored in the constant pool as a pair of (Class, NameAndType). The class component of a symbolic reference may be stored as a CONSTANT_Class corresponding to a class name or type descriptor string. The type descriptor string may be a plug-in type descriptor string. The NameAndType component of a symbolic reference may be stored as a CONSTANT_NameAndType, where the type component is a type descriptor string corresponding to a field or method type. The type descriptor string may be a plug-in type descriptor string. A field type may be combined with one or more type operators. Alternatively, a symbolic reference may be stored in the constant pool as a triple of (Class, Name, Type).

At runtime, access to class members is performed using various byte code instructions which include, but are not limited to, Invokevirtual, Getstatic, Putfield, etc. (collectively referred to herein as "member access byte codes"). A member access byte code takes, as a parameter, a symbolic reference such as CONSTANT_Fieldref or CONSTANT_Methodref. A member access byte code is linked on first execution. During the linking process, the JVM determines the member with the indicated class, name, and type, and stores direct information about that member. Once the JVM has direct information about the member, the type descriptor string for that member generally is no longer needed.

In an embodiment, a member access byte code may receive a symbolic reference in which the class portion includes a plug-in type descriptor string, the type portion includes a plug-in type descriptor string, or both the class and type portions include plug-in type descriptor strings. The following discussion provides examples of each of these three permutations.

In an embodiment, during linking, a member access byte code receives a symbolic reference in which only the class portion includes a plug-in type descriptor string. The member access byte code, which is native to the runtime environment, is insufficient to perform the corresponding member access operation on the plug-in type. The runtime environment calls a bootstrap method in the plug-in type framework to obtain a type descriptor instance corresponding to the plug-in type descriptor string. The runtime environment then calls a method of the type descriptor instance to resolve the symbolic reference denoted by the pair of (Class, NameAndType) or the triple of (Class, Name, Type). The type descriptor instance performs the requested operation(s), based on code defined for the plug-in type. The type descriptor instance returns a reference (e.g., a pointer or handle) to the requested member access operation. The runtime environment uses the reference returned by the type descriptor instance to satisfy the member access operation.

In an embodiment, during linking, a member access byte code receives a symbolic reference in which both the class and type portions include plug-in type descriptor strings. In that case, the type descriptor instance corresponding to the class portion may be expected to respect any semantic demands imposed by the type descriptor string in the type portion of the symbolic reference.

In an embodiment, during linking, a member access byte code receives a symbolic reference in which only the type portion includes a plug-in type descriptor string. In this case, the runtime environment may not obtain a type descriptor instance corresponding to the plug-in type. The runtime environment uses the full syntax of the plug-in type descriptor string to perform symbolic comparisons between types (i.e., comparing two type descriptor strings). Linking is allowed only if type descriptor strings match, including the semantic elements that indicate any constraints imposed by a plug-in type. If code calls for evaluating behavioral properties of the type, the runtime environment may use the built-in operations that apply to the carrier type, disregarding any constraints indicated in the syntax for the plug-in type.

4. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 10:
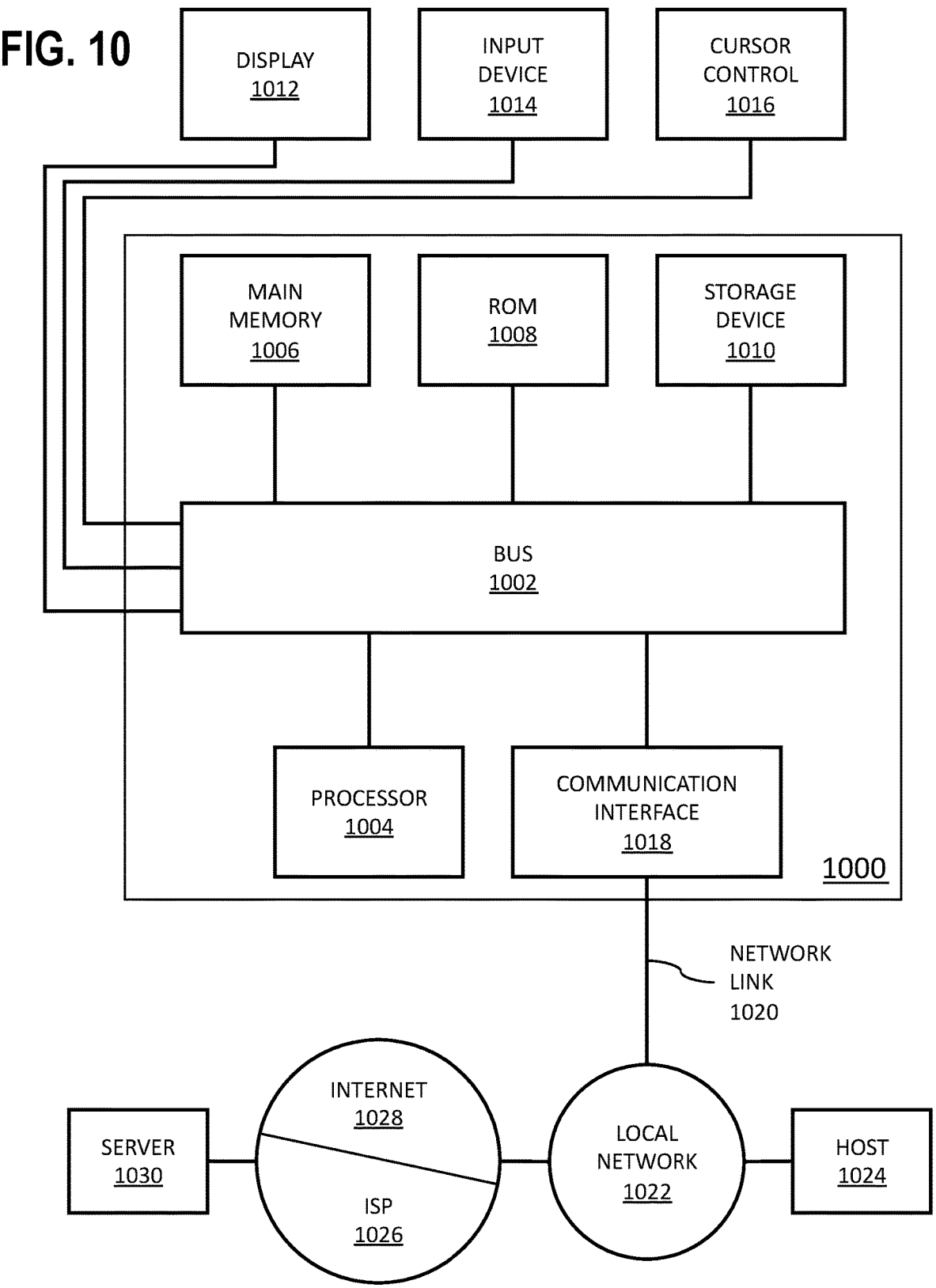
FIG. 10 shows a block diagram that illustrates a computer system in accordance with one or more embodiments.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a liquid crystal display (LCD), plasma display, electronic ink display, cathode ray tube (CRT) monitor, or any other kind of device for displaying information to a computer user. An input device 1014, including alphanumeric and other keys, may be coupled to bus 1002 for communicating information and command selections to processor 1004. Alternatively or in addition, the computer system 1000 may receive user input via a cursor control 1016, such as a mouse, a trackball, a trackpad, a touchscreen, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. The display 1012 may be configured to receive user input via one or more pressure-sensitive sensors, multi-touch sensors, and/or gesture sensors. Alternatively or in addition, the computer system 1000 may receive user input via a microphone, video camera, and/or some other kind of user input device (not shown).

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 1000 can receive the data from the network and place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

6. Computer Networks and Cloud Networks

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:
   receiving a string associated with a type descriptor;
   retrieving a set of rules for built-in reference type descriptors;
   parsing, by a runtime environment, the received string using the set of rules to determine that the received string does not correspond to a built-in reference type; and
   responsive to determining that the received string does not correspond to a built-in reference type:
   accessing, by the runtime environment, a plug-in type framework to obtain a type descriptor instance associated with a particular type descriptor identified by the received string.

2. The media of claim 1, wherein parsing the received string comprises:
   analyzing the received string to determine that a character from among a set of characters that denotes a beginning of a syntax corresponding to a plug-in type is present in the received string.

3. The media of claim 1, wherein parsing the received string comprises:
   analyzing the received string to determine that a final character of the received string matches one of a set of characters that are permitted to terminate a built-in reference type descriptor;
   based on the determination that the final character matches one of the set of characters that are permitted to terminate a built-in reference type descriptor:
   analyzing the received string to determine that an initial character of the received string is not one of a set of characters that are used to begin an array; or
   analyzing the received string to determine that one or more of a set of characters that denotes a beginning of a syntax corresponding to a plug-in type does not follow the initial character; and
   analyzing the received string to determine that not one of a set of characters not permitted in a built-in reference types is present in the received string.

4. The media of claim 1, wherein parsing the received string comprises:
   analyzing the received string to determine that a final character of the received string is not one of a set of characters that are permitted to terminate a built-in reference type descriptor.

5. The media of claim 1, wherein accessing the plug-in type framework comprises:
   determining that the received string corresponds to a particular plug-in type;
   calling, using at least a portion of the received string, a bootstrap method associated with the particular plug-in type; and
   responsive to calling the bootstrap method, receiving the type descriptor instance.

6. The media of claim 1, wherein the type descriptor instance is defined based on the plug-in type framework.

7. The media of claim 1, wherein the type descriptor instance is a metaobject associated with the particular plug-in type, wherein the particular plug-in type corresponds to an overlay of a built-in type in a system of built-in types without modifying or extending a type hierarchy associated with the built-in type.

8. A method comprising:
   receiving a string associated with a type descriptor;
   retrieving a set of rules for built-in reference type descriptors;
   parsing, by a runtime environment, the received string using the set of rules to determine that the received string does not correspond to a built-in reference type; and
   responsive to determining that the received string does not correspond to a built-in reference type:
   accessing, by the runtime environment, a plug-in type framework to obtain a type descriptor instance associated with a particular type descriptor identified by the received string;
   wherein the method is performed by at least one device including a hardware processor.

9. The method of claim 8, wherein parsing the received string comprises:
   analyzing the received string to determine that a character from among a set of characters that denotes a beginning of a syntax corresponding to a plug-in type is present in the received string.

10. The method of claim 8, wherein parsing the received string comprises:
    analyzing the received string to determine that a final character of the received string matches one of a set of characters that are permitted to terminate a built-in reference type descriptor;
    based on the determination that the final character matches one of the set of characters that are permitted to terminate a built-in reference type descriptor:

analyzing the received string to determine that an initial character of the received string is not one of a set of characters that are used to begin an array; or analyzing the received string to determine that one or more of a set of characters that denotes a beginning of a syntax corresponding to a plug-in type does not follow the initial character; and analyzing the received string to determine that not one of a set of characters not permitted in a built-in reference types is present in the received string.

11. The method of claim 8, wherein parsing the received string comprises:

analyzing the received string to determine that a final character of the received string is not one of a set of characters that are permitted to terminate a built-in reference type descriptor.

12. The method of claim 8, wherein accessing the plug-in type framework comprises:

determining that the received string corresponds to a particular plug-in type;

calling, using at least a portion of the received string, a bootstrap method associated with the particular plug-in type; and responsive to calling the bootstrap method, receiving the type descriptor instance.

13. The method of claim 8, wherein the type descriptor instance is defined based on the plug-in type framework.

14. The method of claim 8, wherein the type descriptor instance is a metaobject associated with the particular plug-in type, wherein the particular plug-in type corresponds to an overlay of a built-in type in a system of built-in types without modifying or extending a type hierarchy associated with the built-in type.

15. A system comprising:

at least one device including a hardware processor;

the system being configured to perform operations comprising:

receiving a string associated with a type descriptor;

retrieving a set of rules for built-in reference type descriptors;

parsing, by a runtime environment, the received string using the set of rules to determine that the received string does not correspond to a built-in reference type; and responsive to determining that the received string does not correspond to a built-in reference type:

accessing, by the runtime environment, a plug-in type framework to obtain a type descriptor instance associated with a particular type descriptor identified by the received string.

16. The system of claim 15, wherein parsing the received string comprises:

analyzing the received string to determine that a character from among a set of characters that denotes a beginning of a syntax corresponding to a plug-in type is present in the received string.

17. The system of claim 15, wherein parsing the received string comprises:

analyzing the received string to determine that a final character of the received string matches one of a set of characters that are permitted to terminate a built-in reference type descriptor;

based on the determination that the final character matches one of the set of characters that are permitted to terminate a built-in reference type descriptor:

analyzing the received string to determine that an initial character of the received string is not one of a set of characters that are used to begin an array; or analyzing the received string to determine that one or more of a set of characters that denotes a beginning of a syntax corresponding to a plug-in type does not follow the initial character; and analyzing the received string to determine that not one of a set of characters not permitted in a built-in reference types is present in the received string.

18. The system of claim 15, wherein parsing the received string comprises:

analyzing the received string to determine that a final character of the received string is not one of a set of characters that are permitted to terminate a built-in reference type descriptor.

19. The system of claim 15, wherein accessing the plug-in type framework comprises:

determining that the received string corresponds to a particular plug-in type;

calling, using at least a portion of the received string, a bootstrap method associated with the particular plug-in type; and responsive to calling the bootstrap method, receiving the type descriptor instance.

20. The system of claim 15, wherein the type descriptor instance is defined based on the plug-in type framework.

* * * * *

UNITED STATES PATENT AND TRADEMARK OFFICE
CERTIFICATE OF CORRECTION

PATENT NO. : 12,014,190 B2
APPLICATION NO. : 17/091849
DATED : June 18, 2024
INVENTOR(S) : Rose et al.

It is certified that error appears in the above-identified patent and that said Letters Patent is hereby corrected as shown below:

In the Specification

In Column 8, Line 48, delete "(ParameterDescriptor)" and insert -- {ParameterDescriptor} --, therefor.

Signed and Sealed this
First Day of October, 2024

Katherine Kelly Vidal
*Director of the United States Patent and Trademark Office*